United States Patent
Dharmarajan et al.

(10) Patent No.: US 8,108,371 B2
(45) Date of Patent: Jan. 31, 2012

(54) WEB ENGINE SEARCH PREVIEW

(75) Inventors: Baskaran Dharmarajan, Palo Alto, CA (US); Christopher L. Butler, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/565,216

(22) Filed: Nov. 30, 2006

(65) Prior Publication Data

US 2008/0134093 A1    Jun. 5, 2008

(51) Int. Cl.
G06F 7/00 (2006.01)
(52) U.S. Cl. .................................. 707/705; 715/762
(58) Field of Classification Search ............... 707/3, 705
See application file for complete search history.

(56) References Cited

U.S. PATENT DOCUMENTS

| | | | |
|---|---|---|---|
| 6,448,980 B1 | 9/2002 | Kumar et al. | |
| 6,513,035 B1 | 1/2003 | Tanaka et al. | |
| 6,667,751 B1 | 12/2003 | Wynn et al. | |
| 6,895,407 B2 | 5/2005 | Romer et al. | |
| 2003/0014415 A1 | 1/2003 | Weiss et al. | |
| 2003/0122873 A1* | 7/2003 | Dieberger et al. | 345/764 |
| 2003/0229900 A1* | 12/2003 | Reisman | 725/87 |
| 2004/0003351 A1 | 1/2004 | Sommerer et al. | |
| 2004/0030741 A1 | 2/2004 | Wolton et al. | |
| 2004/0095376 A1 | 5/2004 | Graham et al. | |
| 2005/0080769 A1 | 4/2005 | Gemmell et al. | |
| 2005/0086612 A1* | 4/2005 | Gettman et al. | 715/848 |
| 2005/0102201 A1* | 5/2005 | Linker et al. | 705/27 |
| 2005/0216859 A1 | 9/2005 | Paek et al. | |
| 2006/0059440 A1* | 3/2006 | Pry | 715/838 |
| 2006/0155684 A1 | 7/2006 | Liu et al. | |

OTHER PUBLICATIONS

Mann, Thomas M., "Visualization of WWW-Search Results", http://ieeexplore.ieee.org/iel5/6448/17217/00795176.pdf?isNumber=; Computer and Information Science, University of Konstanz, D-78457 Konstanz, Germany, 5 pgs.
Tim Paek, et al., "WaveLens: A New View onto Internet Search Results"; http://delivery.acm.org/10.1145/990000/985784/p727-paek.pdf?key1=985784&key2=6503499511&coll=GUIDE&dl=GUIDE&CFID=1340705&CFTOKEN=44535798; CHI 2004 Paper, vol. 6, No. 1, Apr. 24-29, Vienna Austria; pp. 727-734.
Michelle Chang, et al.; "Collection Understanding"; http://ieeexplore.ieee.org/iel5/9280/29473/01336144.pdf?isNumber=; Proceedings of the 2004 Joint ACM/IEEE Conference on Digital Libraries (JCDL '04); pp. 334-342.
Muriel Foulonneau, et al., "Automated Capture of Thumbnails and Thumbshots for Use by Metadata Aggregation Services", http://www.dlib.org/dlib/january06/foulonneau/01foulonneau.html; D-Lib Magazine, Jan. 2006, vol. 12, No. 1, 14 pgs.

* cited by examiner

*Primary Examiner* — Fazlul Quader
(74) *Attorney, Agent, or Firm* — Shook Hardy & Bacon LLP

(57) ABSTRACT

Presenting both hyperlinks and thumbnail versions of search engine results is described in this application. More specifically, a graphical user interface (GUI) having multiple display areas is described. One display area is configured for displaying the hyperlinks returned from a search-engine query. Another display area is configured to display thumbnail versions of the one or more web pages related to the search-engine query. The thumbnail versions are retrieved after a search-engine query is submitted and after hyperlinks to relevant web pages are received. Each relevant web page is retrieved on one or more background threads. The retrieved web pages are then stored, and their thumbnail versions are presented along with the hyperlinks.

18 Claims, 6 Drawing Sheets

WEB ENGINE SEARCH PREVIEW

BACKGROUND

The Internet is a worldwide system of interconnected computer networks that transmits data. Various information and services are carried via the Internet, such as electronic mail (e-mail), online chat rooms, and the World Wide Web (the Web). In particular, the Web is an information space in which online documents called web pages are stored and published for the entire computing world to access. Anyone connected to the Internet can view the myriad of web pages available online by accessing global identifiers called Uniform Resource Identifiers (URIs). Once a user accesses a URI, the user's Internet browser retrieves the web page associated with the URI and displays it on the user's computing device.

Search engines are popular tools for browsing the myriad of web pages on the Web without knowledge of specific URIs. For example, MSN®, Yahoo!®, Google® are some popular search engines on the Web due to their ability to locate web pages associated with search terms. Once a query is initiated by submitting search terms, a search engine returns a list of hyperlinks to web pages that are related to the search terms. Textual excerpts of relevant portions of the related web pages may also be listed along with the hyperlink. However, the user must eventually select the hyperlinks to view any of the actual web pages. Consequently, the user is left with the tedious task of clicking through multiple hyperlinks to locate a web page containing what he/she is looking for. This can be very time consuming, since search engines frequently list web pages that do not accurately match query terms and some terms may have multiple meanings.

Conventional search engines are now beginning to display a thumbnail image only for some web pages listed in the results of a search-engine query. The reason thumbnails for some web pages are generated while others are not is two fold. First, the thumbnails are generated by web crawlers that are constantly indexing web pages on the Web. These generated thumbnails are stored on servers owned by the search engine and updated only periodically. Because web crawlers cannot search and index every web page available on the Internet, only a limited number of thumbnails are stored. Second, the capacity needed to store thumbnails of every available web page is enormous. Storing a thumbnail of every web page would be a terrible waste of storage. In addition, web pages are constantly changing, so a thumbnail of a web page when a web crawler first locates it may be stale by the time a user queries for it.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Presenting both hyperlinks and thumbnail versions of search engine results is described herein. More specifically, a graphical user interface (GUI) having multiple display areas is described. One display area is configured for displaying the hyperlinks returned from a search-engine query. Another display area is configured to display thumbnail versions of the one or more web pages related to the search-engine query.

Retrieving the thumbnail versions of web pages for display along with the hyperlinks returned from the search-engine query is also described herein. Once the search-engine query is submitted and hyperlinks to relevant web pages are received, the web pages are retrieved on one or more background threads. The retrieved web pages are then stored, and their thumbnail versions are presented along with the hyperlinks. As a result, a user can view a list of hyperlinks to relevant web pages along with thumbnail versions of those web pages.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Embodiments described herein generally relate to displaying the results of a search-engine query to a user. In one embodiment, the results are displayed as a list of hyperlinks and thumbnail versions of relevant web pages. A search-engine query, as discussed herein, refers to any keyword or phrase search of the Web by a search engine. Web-search queries may be initiated in any number of ways well known to those skilled in the art. For example, a user may enter keywords or phrases into a text field on a search engine's web page or into a text field of a web browser's tool bar. It will be apparent to those skilled in the art that numerous methods for initiating a search engine query are also possible and need not be discussed at length herein. While embodiments discussed herein refer to accessing web pages on the Web via the Internet, other embodiments may access electronic documents via a private network.

Figure 1:
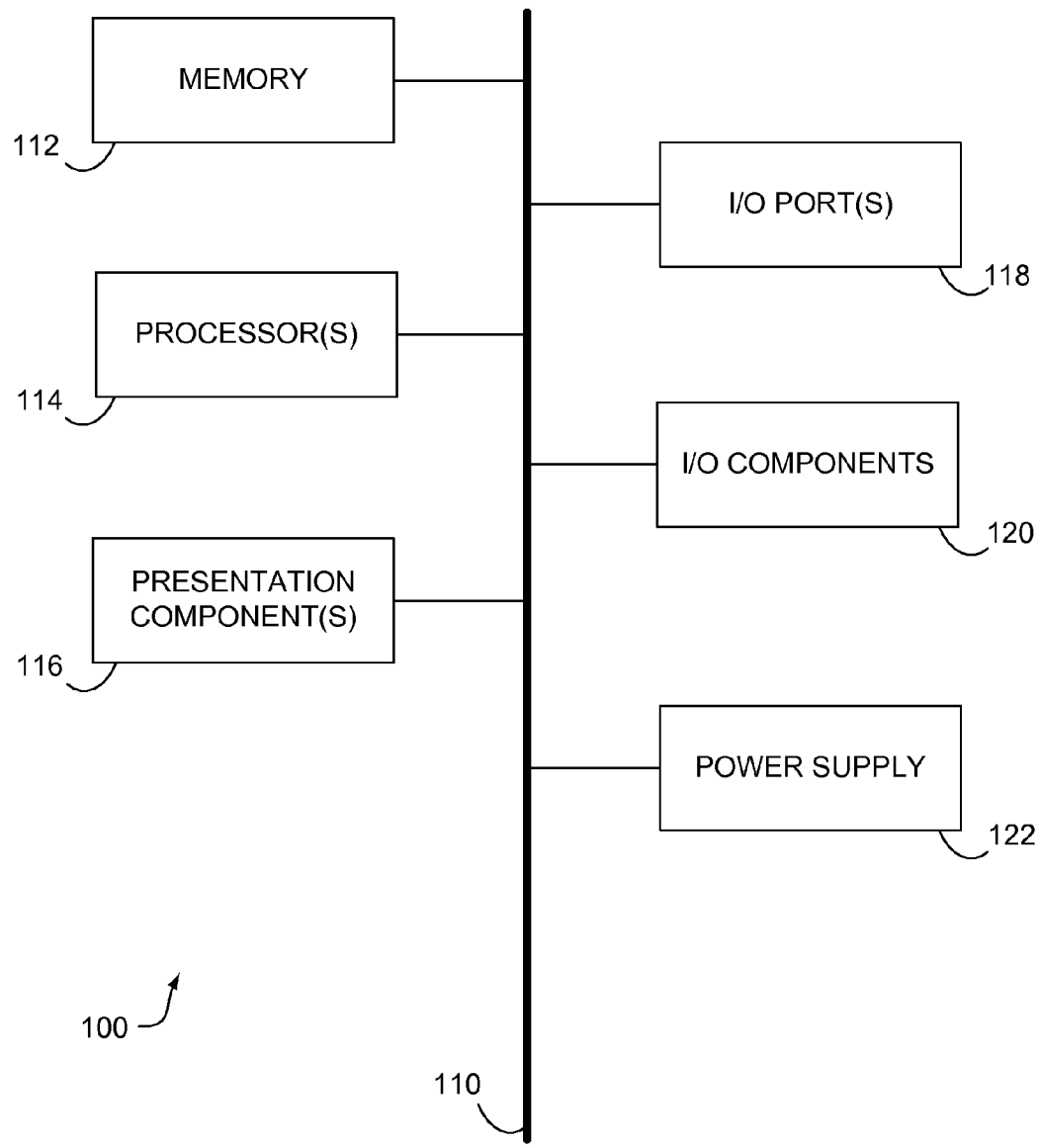
FIG. 1 is a block diagram of an exemplary operating environment for use in implementing an embodiment of the present invention.

Having briefly described a general overview of the embodiments described herein, an exemplary operating environment is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

The invention may be described in the general context of computer code or machine-useable instructions, including computer-executable instructions such as program modules, being executed by a computer or other machine, such as a PDA or other hand-held device. Generally, program modules including routines, programs, objects, components, data structures, and the like, refer to code that perform particular tasks or implement particular abstract data types. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other computer-storage media.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
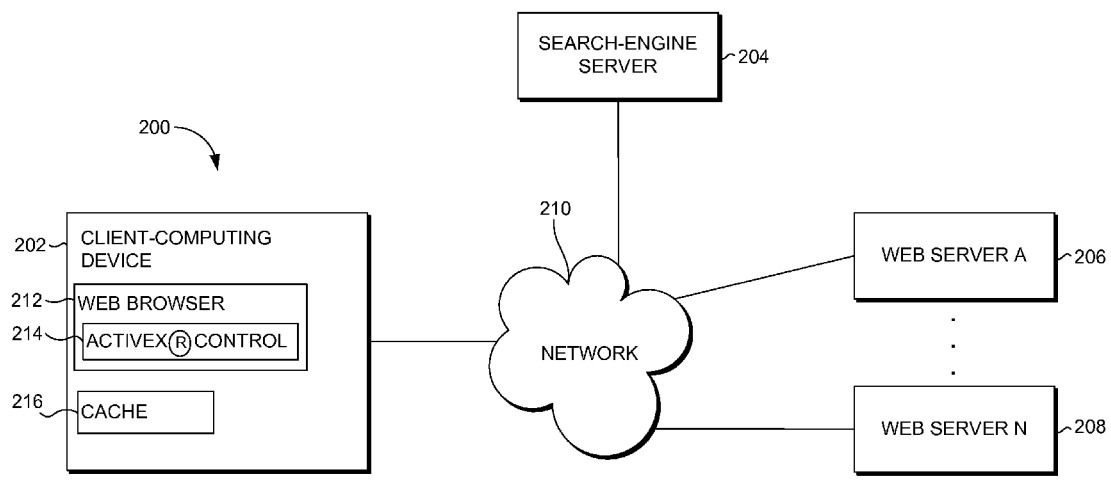
FIG. 2 is a block diagram of a networking environment for use in implementing an embodiment of the present invention.

Turning now to FIG. 2, a block diagram depicting a networking architecture 200 is shown for use in implementing an embodiment of the present invention. The networking architecture 200 comprises a client computing device 202, search-engine server 204, and one or more web servers (indicated in FIG. 2 as a web server A 206 and a web server N 208), all of which are coupled together via network 210. The dots between the web server A 206 and the web server N 208 indicate that, in some embodiments, the number of web servers is scalable and may include any number of servers accessible over the network 210. One skilled in the art will appreciate this concept, because web pages are typically hosted on different web servers. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client computing device 202 may be any type of computing device, such as device 100 described above with reference to FIG. 1. By way of example only and not limitation, the client computing device 202 may be a personal computer, desktop computer, laptop computer, handheld device, cellular phone, digital phone, smartphone, PDA, or the like. It should be noted that embodiments are not limited to implementation on such computing devices.

Network 210 may include any computer network or combination thereof. Examples of computer networks configurable to operate as network 210 include, without limitation, a wireless network, landline, cable line, fiber-optic line, local area network (LAN), wide area network (WAN), metropolitan area network (MAN), or the like. Network 210 is not limited, however, to connections coupling separate computer units. Rather, network 210 may also comprise subsystems that transfer data between servers or computing devices. For example, network 210 may also include a point-to-point connection, the Internet, an Ethernet, a backplane bus, an electrical bus, a neural network, or other internal system.

In an embodiment where network 210 comprises a LAN networking environment, components are connected to the LAN through a network interface or adapter. In an embodiment where network 210 comprises a WAN networking environment, components use a modem, or other means for establishing communications over the WAN, to communicate. In embodiments where network 210 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The search-engine server 204, the web server A 206, and the web server N 208 may include any type of application server, database server, or file server configurable to perform the methods described herein. In addition, each of the search-engine server 204, the web server A 206, and the web server N 208 may be a dedicated or shared server. One example, without limitation, of a server that is configurable to operate as the search-engine server 204, web server A 206, and web server N 208 is a structured query language ("SQL") server executing server software such as SQL Server 2005, which was developed by the Microsoft® Corporation headquartered in Redmond, Wash.

Components of the search-engine server 204, the web server A 206, and the web server N 208 may include, without limitation, a processing unit, internal system memory, and a suitable system bus for coupling various system components, including one or more databases for storing information (e.g., files and metadata associated therewith). Each server typically includes, or has access to, a variety of computer-readable media.

It will be understood by those of ordinary skill in the art that networking architecture 200 is merely exemplary. While the search-engine server 204 is illustrated as a single box, one skilled in the art will appreciate that the search-engine server 204 is scalable. For example, the search-engine server 204 may in actuality include 100 servers in communication. The single unit depictions are meant for clarity, not to limit the scope of embodiments in any form.

In operation, the search-engine server 204 hosts a search engine designed to receive queries from remote computing devices (such as the client-computing device 202) and locate information on the Web or within a private network to satisfy the queries. A query may consist of a request for information on the Web or private network that contains specific keywords or phrases. In some embodiments, the search engine executing on the search-engine server 204 uses regularly updated indexes, which are created by Web crawlers, to quickly locate web pages satisfying a query. Once the web pages are located, their URIs are transmitted back to the remote computing device and displayed as hyperlinks thereon. To access a located web page, a use need only select the corresponding hyperlink. One skilled in the art will appreciate that various other techniques exist for mining information on the Web or a private network.

Web pages are stored on the various web servers (e.g., the web servers A 206 and N 208) and accessible via the network 210 using a transfer protocol and relevant URI. The client-computing device 202 may fetch a web page by requesting the URI using the transfer protocol. As a result, the web page can be downloaded to the client-computing device 202 and stored in the cache 216. The stored web page can then be read by the web browser 212 and presented to a user.

The client-computing device 200 comprises a web browser 212 and cache 216. The web browser 212 is a software application enabling a user to display and interact with information located on a web page. In an embodiment, the web browser 212 communicates with the search-engine server 204, the web server A 206, and the web server N 208, using a transfer protocol to fetch web pages. Pages may be located by the web browser 212 by sending the transferring protocol and the URI. The web browser 212 may use other URI types and protocols, such as file transfer protocol (FTP), real-time streaming protocol (RTSP), etc. The web browser 212 also understands a number of file formats—such as hypertext markup language (HTML), graphics interchange format (GIF), tagged image file format (TIFF), portable document format (PDF), or joint photographic experts group (PDF) file format, and the like—the wealth of which can be extended by downloaded plug-ins.

In one embodiment, the web browser 212 includes a control 214 that enables thumbnail versions of web pages to be displayed along with the web pages' hyperlinks. The control 214 may be any type of programmatic interface—including, for example but without limitation, an ActiveX® control used in conjunction with the Internet Explorer® web browser or other similar software used with various web browsers (e.g., Firefox). Additionally, various APIs, scripts, schemas, or other such software may be used in conjunction with the control 214 to display thumbnail versions of the web pages in the list of hyperlinks.

Cache 216 is a temporary storage medium where frequently accessed data can be stored for rapid access. More specifically, cache 216 may comprise any of the aforementioned computer-storage media. The web browser 212 may have access to cache 216. In one embodiment, URIs returned by the search-engine server 204 and web pages fetched by the web browser 212 are stored in cache 216.

In operation, a search-engine query may be submitted by a user from the client-computing device 202. For instance, the user may enter "weather in Seattle" in a toolbar text field. Once submitted, the query is transmitted to the search-engine server 204 where the search engine is located. Using techniques well known to those skilled in the art, the search engine attempts to locate web pages with information relevant to the search-engine query. If the search engine locates relevant web pages, the URIs of the web pages are returned to the client computing-device 202. A list of the URIs can then be presented to the user in the web browser 212.

In one embodiment, an extension to the toolbar of the web browser 212 monitors for search-engine results. For each hyperlink received as a result of a search-engine query, the extension creates an instance of the control 214. Each instance is initialized with the URI for a returned hyperlink. In one embodiment, the instance of the control 214 is confined to a certain size for displaying a thumbnail version of a retrieved web page. For example, the instance may be set to 25 pixels by 25 pixels, or some other size. The extension may also be configured to insert a hidden control similar to the control 214 for displaying an enlarged version (discussed below) of the thumbnail version or a context menu (discussed below) for manipulating the associated web page.

In one embodiment, the instance of the control 214 may be initially painted with a status message to indicate that the thumbnail version is being retrieved. The status message may include, for example, an hourglass or a wrist watch. In the meantime, the control 214 may queue one or more requests for URIs associated with the web pages in the search results. In one embodiment, a plurality of web browsers 212 retrieve the web pages associated with the URIs on one or more background threads of the client computing device 202. To expedite the process, multiple web browsers 212 may execute simultaneously to retrieve the web pages of the returned URIs. For example, suppose the search engine returned four web pages that contained information about "weather in Seattle." Four web browsers 112 could be opened on background threads to retrieve the four web pages. Embodiments are not limited, however, to any particular number of browsers operating in background threads.

Retrieving the web pages associated with each hyperlink returned from the search engine ensures that the web browser 112 will only receive web pages that are current at the time of the search-engine query. Displayed thumbnail versions of the retrieved web pages will illustrate the web pages at the time of the search-engine query. As a result, the web pages will not be stale like the thumbnail versions that are stored and pulled from the servers of conventional search engines. Moreover, actively retrieving every web page associated with the returned hyperlinks eliminates the need to retrieve and store thumbnails of everything on the Web beforehand. Thus, a current thumbnail version of each web page returned by a search engine can be generated for any web page.

The web browsers executing on background threads may retrieve web pages in a safe mode (commonly referred to as "restricted zone" in Microsoft's® Internet Explorer). Safe mode means that no active components (such as scripts, APIs, controls, etc.) are executed when the web page is retrieved. Examples of active controls include, without limitation, Java-Script, ActionScript, ActiveX® controls, Flash applications, and the like. Retrieving the web pages in safe mode effectively protects the client-computing device 202 from a host of malicious active components. One method of retrieving web pages in safe mode involves transmitting a header indicating a pre-fetching operation to the web server. It will be understood to those skilled in the art that various other methods are also possible and need not be discussed at length herein.

In one embodiment, the control 214 is notified when all the web pages are retrieved. In an embodiment, a snapshot of the retrieved web pages are stored as GIF files in cache 216. The snapshot may be any size, such as a full-screen image. The control 214 can create a thumbnail version of each web page by resizing the snapshot to the user-configured instance discussed above. The display area within the control 214 instance is painted with the snapshot of a web page. If an error occurs in retrieving the web page, an error message is painted in the control 214 instance. Moreover, if anti-phishing software or parental controls determine that the web page should not be displayed or should be edited before display, then the thumbnail version can be painted accordingly.

The web browser 212 may be configured to present a thumbnail version of the retrieved web pages using the control 214 along with a corresponding API. In one embodiment, these thumbnail images are presented along with their respective hyperlinks to the user. With the thumbnail versions positioned close to the hyperlinks, a user no longer has to click through various links to identify a particular web page.

The control 214 may be used to display an enlarged version of any thumbnail. The enlarged version is a representation of a thumbnail version that is displayed at a user-configurable size on the web browser 212. For example, the enlarged version may occupy 90% of the web browser 212's display area. In one embodiment, the enlarged version is initiated when a user indication is sent to the control 214. The user indication may include a user hovering a mouse cursor over the thumbnail version, right-clicking the thumbnail version to display a menu (e.g., a context menu 420 discussed below) and selecting an option, or using a keyboard-enable macro. Other user indications are also possible. In one embodiment, a hidden instance of the control 214 is inserted into the display area of the web browser 212. Once a user indication to view an enlarged version is received, the control 214 may direct the hidden instance to become visible and display the enlarged version of the thumbnail.

Other display options may also be incorporated into various embodiments. The control 214 may be configured to display a context menu with options for opening the web page in a foreground or background windows of the web browser 212 or in various tabs within a window of the web browser 212 (as displayed in FIG. 4C). Further, all of the web pages for all of the hyperlinks in a search-engine query result can optionally be opened in the foreground or background of an open web browser. Further still, tabs for each retrieved web page can be optionally listed across the web-browser user interface, whereby a user can preview a particular web page by selecting its respective tab.

Figure 3:
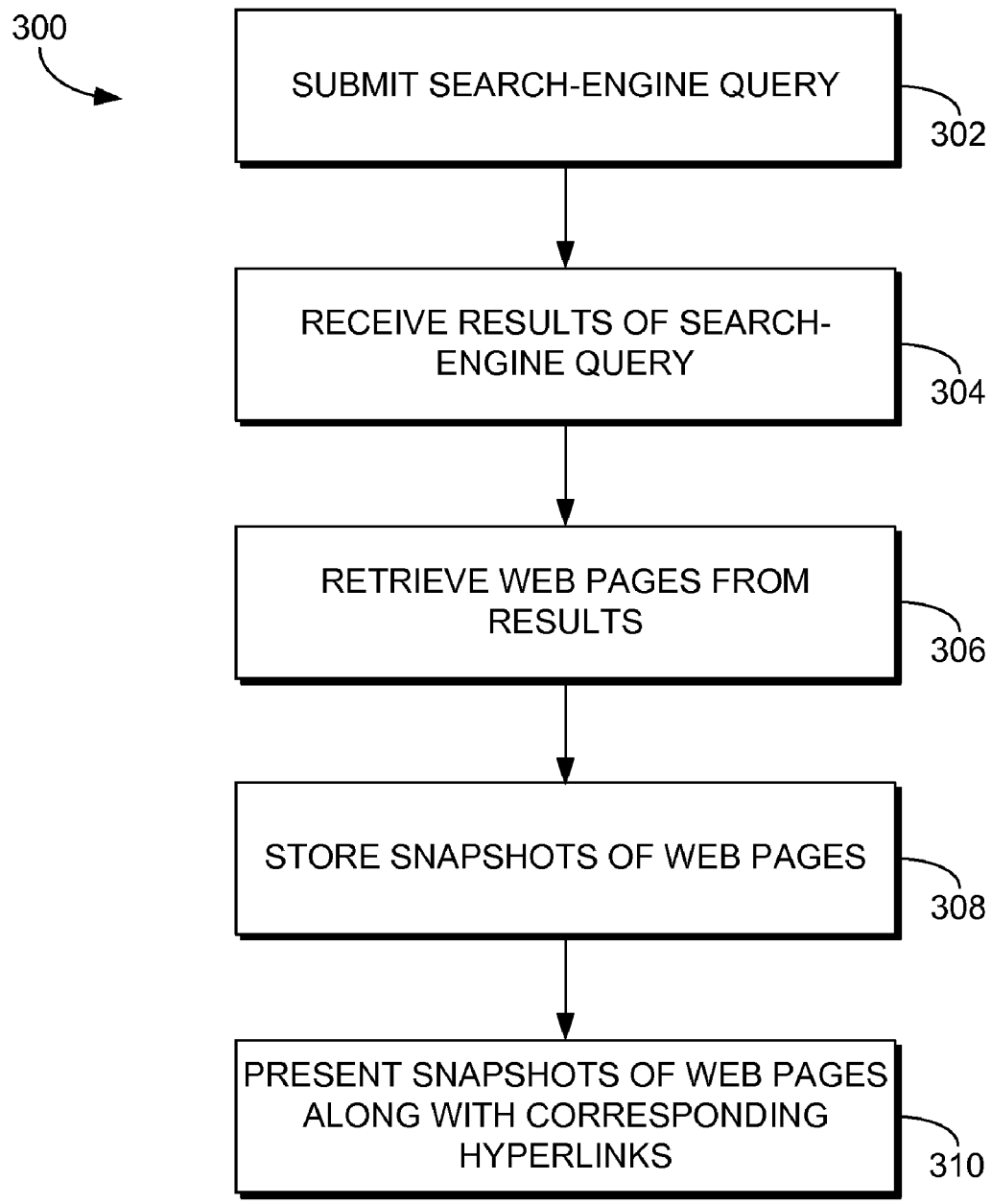
FIG. 3 is a flowchart illustrating a process for displaying thumbnail versions of web pages along with associated hyperlinks that are returned from a search-engine query, according to embodiments of the present invention.

Turning now to FIG. 3, a flowchart is presented illustrating a process 300 for displaying thumbnail versions of web pages along with associated hyperlinks that are returned from a search-engine query, according to embodiments of the present invention. Initially, a search-engine query is submitted, indicated at block 302. As previously mentioned, this may be done by submitting keywords or phrases into a text field of a search-engine's web page or a web-browser toolbar. Once submitted, the search-engine query is transmitted to a search engine, which may be executing on a server (e.g., the search-engine server 204). After attempting to locate web pages relevant to the search-engine query, the search engine returns the results of the query, indicated at block 304. These results may include hyperlinks to the relevant web pages.

For any hyperlink returned, the accompanying web page is retrieved, indicted at 306. In one embodiment, multiple returned web pages are retrieved simultaneously on background threads of a client-computing device (such as the client-computing device 202) using multiple web browsers, as indicated at 306. In another embodiment, the web pages are retrieved in a safe mode to prevent downloading potentially damaging content. Snapshots of the retrieved web pages are stored (indicated at block 308) on the client-computing device. To the contrary of conventional search engines, the snapshots are not pulled from a server containing previously captured thumbnails. Instead, the stored snapshots capture the retrieved web pages as the web pages exist at the time of the search-engine query. In one embodiment, these snapshots are GIF files of the web pages. In another embodiment, the snapshots include highlighted portions of the web page relative to the search-engine query.

Thumbnail versions of the stored snapshots may then be presented to a user along with the returned hyperlinks, indicated at block 310. The thumbnail versions enable the user to view the web page before selecting the hyperlink. As a result, the user can quickly determine which web page contains the information sought after without ever leaving a list of the web results.

At the indication of a user, various preview options may be manipulated. For example, the size of the thumbnail or enlarged versions may be changed. The display of the thumbnails may be turned off so that only the hyperlinks are displayed. Alternatively, the display of the text may be turned off so that only the thumbnails are displayed. Or an enlarged version of the thumbnails may be opened and referenced under a tab for selection by the user. In this last feature, the user can simply click through the displayed tabs to view a version of a web page.

Figure 4A:
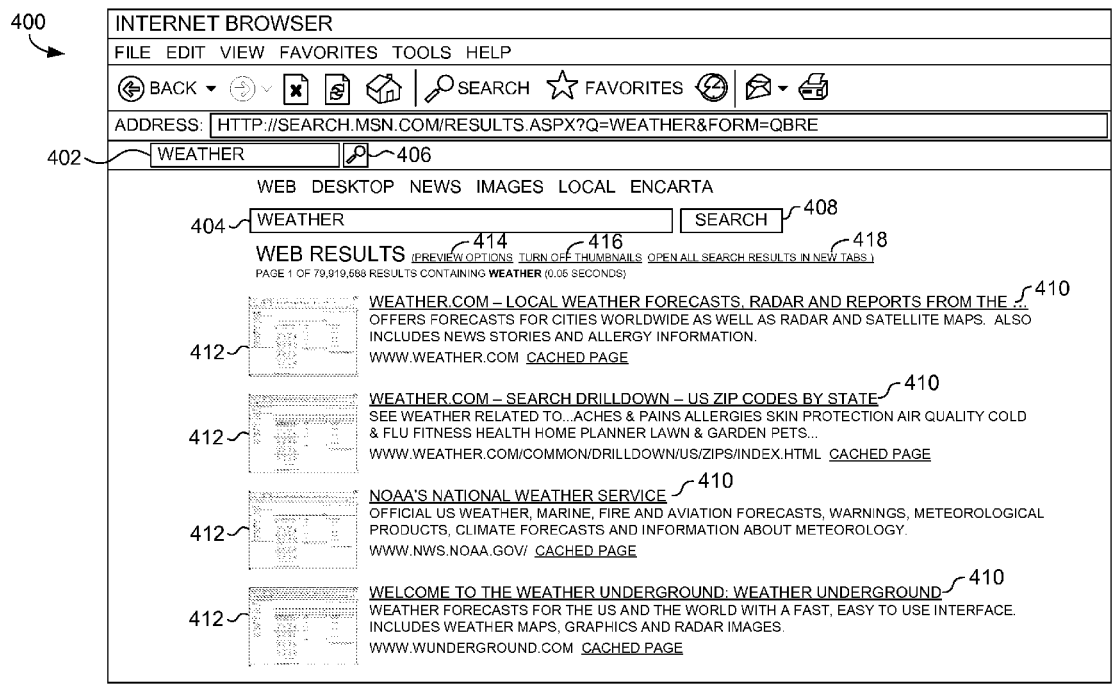
FIG. 4A is an exemplary display of a graphical user interface for presenting thumbnail versions of web pages associated with hyperlinks that are returned in response to a search-engine query, according to embodiments of the present invention.

FIG. 4A is an exemplary display of a graphical user interface (GUI) 400 for presenting thumbnail versions of web pages associated with hyperlinks that are returned in response to a search-engine query, according to embodiments of the present invention. GUI 400 depicts an open web browser window. One skilled in the art will understand that numerous web browsers are available with varying features orientations. Accordingly, embodiments are not be limited to any standard buttons, toolbars, menus, or orientation of hyperlinks and thumbnail versions. For example, thumbnail versions may alternatively be positioned to the right, below, or above respective hyperlinks.

In the embodiment depicted in FIG. 4A, a user may submit a search-engine query by entering keywords or phrases into either a toolbar text entry field 402 and selecting a search icon 406, or into a text field 404 on the search engine's web page and selecting a search button 408. Hyperlinks 410 to web pages the search engine determined were relevant are displayed in response to the query. Additionally, the thumbnail versions 412 of snapshots of the displayed web pages may also be presented. In one embodiment, these snapshots are saved as GIF files. In another embodiment, the thumbnail versions 412 are displayed using an ActiveX® control and an API.

The user may manipulate the thumbnail versions 412 by selecting an option in the PREVIEW OPTIONS menu 414. In one embodiment, a menu of various options (not shown for clarity) for manipulating the thumbnail versions 412 is displayed when the user selects the PREVIEW OPTIONS menu 414. One skilled in the art will appreciate that a plethora of options can be incorporated. For example, the options may give the user the ability to change the thumbnail versions' size, length, width, color, contrast, pixel count, resolution, quality, etc. In addition, an option may be incorporated to highlight the search terms in the thumbnail versions 412.

The thumbnail versions may be selectively eliminated from the display by selecting the TURN OFF THUMB-NAILS OPTION 416. Or enlarged versions of all the thumbnail versions may be opened and organized under different tabs on the GUI 400 (discussed in more detail below with reference to FIG. 4C).

Figure 4B:
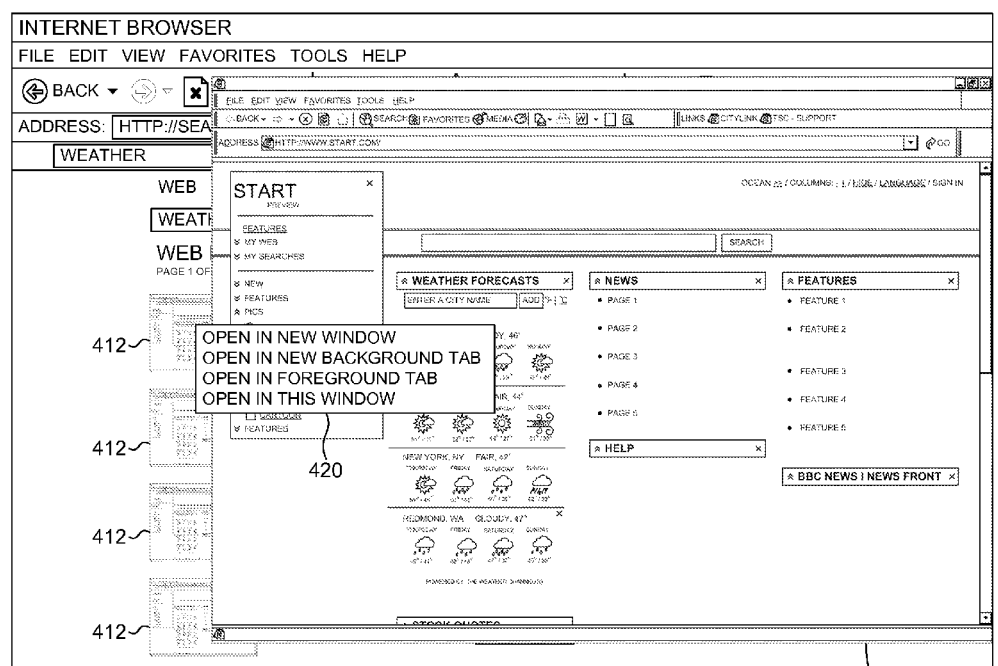
FIG. 4B is an exemplary display of a graphical user interface for presenting thumbnail and enlarged versions of web pages, according to embodiments of the present invention.

Turning now to FIG. 4B, an exemplary display of the GUI 400 presenting thumbnail and enlarged versions of web pages is illustrated. Because a thumbnail version 412 are relatively small, it may be difficult to read or view. Therefore, it may be desirous to view an enlarged version of the displayed thumbnail versions 412. To manipulate the display of a thumbnail version 412 that is displayed, a user may open a context menu 420 by right-clicking on the thumbnail version 412. In another embodiment, the context menu is automatically displayed whenever a mouse cursor is positioned over the thumbnail version 412. The context menu 420 may include any options well known to those skilled in the art, such as opening the selected thumbnail version 412 in a new window, background tab, foreground tab, or the current window. A user can indicate which action to take by clicking on the menu topic.

The user may desire to view a larger version of the web page represented in the thumbnail version 412. Therefore, the context menu 420 may include an option to open the web page in the current application window. As indicated in FIG. 4B, an option entitled "OPEN IN THIS WINDOW" may provide such functionality to open an enlarged version 422 of the thumbnail version 412. In one embodiment, the enlarged version 422 is 90% of the size of the actual web page. If the thumbnail version 412 contains highlighted portions, the enlarged version 422 may also be configured to display highlighted portions. Embodiments are not limited to any particular size; rather, one skilled in the art will appreciate that numerous sizes may be employed.

The Web contains a plethora of maturity-sensitive material. It may therefore be desirable to review the content of the web pages associated with the list of hyperlinks before displaying thumbnail versions of them. Furthermore, it may also be desirous to remove inappropriate words or pictures before the enlarged version 422 is displayed to a user. In some embodiments, parental controls are used to review web content before being displayed in the thumbnail version 412 or the enlarged version 422. Parental controls may be used to review the content of the thumbnail version 412 or the enlarged version 422 before presenting either to the user.

One skilled in the art will appreciate that numerous methods exist for implementing parental controls to review web content. For instance, an operating system programming interface or API can be configured to gather information about foreign applications (e.g., web browsers and chat applications) and then seize control of the foreign applications when the information gathered triggers a positive in a database of banned words. The database of banned words may be hard-coded or placed in a flat file and loaded into memory. An alternative method of configuring parental controls may use a proxy computing device that acts as a middle tier between the client computing device 202 and the web services A 206 and N 208. In one embodiment, a web browser on the client computing device 202 communicates with the proxy computing device. The proxy computing device handles a web-page request by fetching a web page and returning the web page to the web browser. The proxy computing device may be configured to inspect the web page's content before transmitting it to the web browser on the client computing device 202. If rules or definitions on the proxy computing device determine that the web page's content is inappropriate, the content may be tagged accordingly and not delivered to the web browser of the client computing device 202. In one embodiment, the proxy computing device is an http proxy and receives an http header request for a web page. The proxy computing device may be configured to parse the host section or the get section of the header and do a search in a database of user-defined words or URIs. If the host or get sections match a URI in the database, the proxy computing device may be configured to prevent the requested web page from being sent to the client computing device 202. One skilled in the art will understand that numerous other methods of implementing parental controls may also be used.

Aside from maturity-sensitive content, the Web has also become a breeding ground for phishing web sites, e-mails, and instant-messaging (IM) applications. Phishing occurs when a web page, instant message, or e-mail acquires sensitive information (e.g., passwords or credit card information) by masquerading as a trustworthy person or business in an electronic communication. Anti-phishing software may be incorporated in some embodiments to preclude downloading web pages used for phishing. Many web browsers include various forms of anti-phishing software. Examples of such web browsers include, without limitation, Internet Explorer® 7 developed by the Microsoft® Corporation headquartered in Redmond, Wash. and Firefox 2 developed by Mozilla headquartered in Mountain View, Calif. In one embodiment, the anti-phishing software checks a web page on the list of hyperlinks against a list of known phishing web pages stored on a server of the client computing device 202. If the a web page in the list is suspect, the anti-phishing software may either warn a user or stop the downloading of the web page for display in the thumbnail version 412. In an alternative embodiment, a domain name system (DNS) service executing on a DNS server is used to filter out known phishing domains. Other methods and anti-phishing software are also possible in alternative embodiments, and are generally well known to those skilled in the art.

Figure 4C:
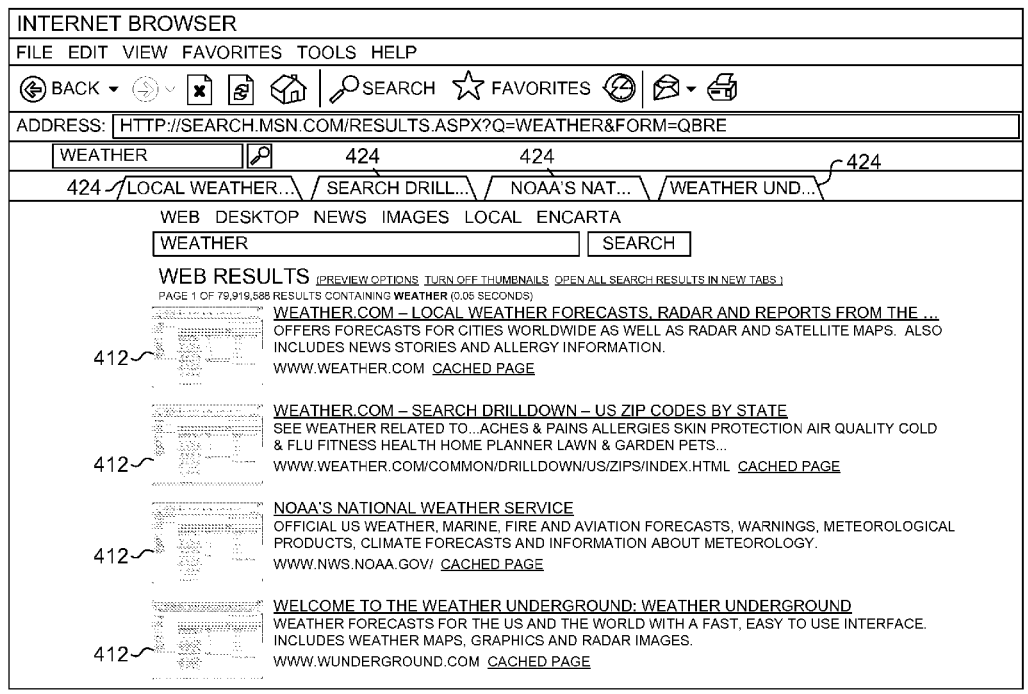
FIG. 4C is an exemplary display of a graphical user interface for presenting thumbnail versions and tabs to enlarged versions of web pages, according to embodiments of the present invention.

FIG. 4C is an exemplary display of the GUI 400 for displaying enlarged thumbnail versions 412 and organizing the enlarged versions into tabs, according to an embodiment of the present invention. In an embodiment, this option is initiated by selecting the OPEN ALL SEARCH RESULTS IN NEW TABS option 418 of FIG. 4A. This option creates enlarged versions of all the thumbnail versions 412 and relevant tabs 424. To view a thumbnails version 412's enlarged version, the user can simply select the relevant tab 424. For example (with reference FIG. 4C), if a user would like to better view the NOAA's National Weather Service enlarge version, the user need only select its tab.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A graphical user interface embodied on a tangible computer-readable medium and executable on a computer for displaying a search result received in response to a search-engine query, said graphical user interface comprising:
 a first display area of a search-results webpage that displays content received by a web browser running on the computer, wherein the content includes a hyperlink of a web page deemed to satisfy the search-engine query;
 a second display area of the search-results webpage that displays content retrieved in real time from a web server by another web browser running on a background thread of the web browser,
  wherein the content retrieved by the other web browser includes a thumbnail image of the web page displayed next to the hyperlink of the webpage, and
  wherein the hyperlink and the thumbnail image are displayed together as part of the search-results webpage; and
 a third display area of the search-results webpage that displays a preview-options GUI element, which allows a user to control a presentation of the thumbnail image in the second display area.

2. The graphical user interface of claim 1, wherein the preview-options GUI element provides an option to designate a display size for the one or more thumbnail versions.

3. The graphical user interface of claim 1, wherein the preview-options GUI element provides an option to not display the thumbnail image.

4. The graphical user interface of claim 1, wherein the preview-options GUI element provides an option to display the thumbnail as one or more display tabs.

5. The graphical user interface of claim 1, wherein the thumbnail image is stored on a client computing device in a graphic interchange format (GIF).

6. The graphical user interface of claim 1, wherein the thumbnail image is stored on a client computing device in a tagged image file format (TIFF).

7. The graphical user interface of claim 1, wherein the search-engine query comprises a keyword search on a search engine.

8. The graphical user interface of claim 1, wherein the preview-options GUI element provides an option to display an enlarged version of the web page.

9. The graphical user interface of claim 1, wherein the preview-options GUI element provides an option to present one or more graphical tabs associated with the web page.

10. A method for displaying a set of search results received in response to a search-engine query, the method comprising:
 submitting the search-engine query that is input into a field of a web browser running on a computing device, the web browser including a control that enables thumbnails to be presented together with the set of search results;
 receiving a plurality of web-page addresses of web pages deemed to satisfy the search-engine query;
 without user intervention, creating a set of instances of the control, wherein each instance is associated with a respective web-page address selected from among the plurality of web-page addresses;
 simultaneously executing a plurality of web browsers on background threads of the web browser,
  wherein each web browser of the plurality of web browsers is associated with a respective instance from among the set of instances and
  wherein each web browser executes the respective web-page address of the respective instance associated therewith;
 receiving the web pages deemed to satisfy the search-engine query,
  wherein the web pages are stored in a cache of the computing device and
  wherein, because the plurality of web browsers are executed after submission of the search-engine query, the web pages stored in the cache are current relative to the search-engine query; and
 from a web page stored in the cache, creating a thumbnail depicting the web page, wherein the thumbnail is displayed adjacent to a web-page address of the web page.

11. The method of claim 10, wherein the plurality of web browsers operate in safe mode on a client computing device.

12. The method of claim 10, wherein the control includes an ActiveX® control.

13. The method of claim 10, further comprising:
 presenting graphical tabs associated with the web pages; and
 incident to a user's selection of one of the graphical tabs, presenting a version of the web page.

14. The method of claim 10, wherein the web pages are retrieved in a manner that restricts execution of web-page active components.

15. The method of claim 10, further comprising:
 receiving an indication from a user to view an enlarged version of the web page; and
 presenting the enlarged version.

16. Computer-storage media having computer-executable instructions embodied thereon that, when executed by a computing device, facilitate a method for presenting a search result received in response to a search-engine query, the method comprising:
 submitting by the computing device the search-engine query, which was inputted into a web browser;
 receiving by the computing device a hyperlink of a web page deemed to satisfy the search-engine query, wherein the hyperlink is received by the web browser running a control;
 after receiving the hyperlink, using the control to automatically generate by the computing device a web-browser instance that is executed on a background thread of the web browser and that retrieves from a web server the web page identified by the hyperlink, wherein the web-browser instance operates in safe mode that does not allow controls to be executed;
 storing a snapshot of the web page retrieved in real time by the web-browser instance, wherein the snapshot is used to create a thumbnail of the web page; and
 presenting the thumbnail together with the hyperlink as part of a search-results webpage.

17. The one or more computer-readable media of claim 16, wherein the thumbnail includes at least one of a graphics interchange format (GIF), tagged image file format (TIFF), portable document format (PDF), or joint photographic experts group (JPEG) file format.

18. The one or more computer-readable media of claim 16, further comprising highlighting one or more search terms from the search-engine query in the thumbnail.

* * * * *